(12) United States Patent
Martens (10) Patent No.: US 6,879,896 B2
(45) Date of Patent: Apr. 12, 2005

(54) SYSTEM AND METHOD FOR USING VEHICLE OPERATOR INTENT TO ADJUST VEHICLE CONTROL SYSTEM RESPONSE

(75) Inventor: John D. Martens, New Hudson, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/122,604

(22) Filed: Apr. 11, 2002

(65) Prior Publication Data

US 2003/0195684 A1 Oct. 16, 2003

(51) Int. Cl.$^7$ ............................................. G06F 17/00
(52) U.S. Cl. ......................... 701/41; 701/37; 180/271; 280/735
(58) Field of Search ................ 303/146, 147, 303/113.1, 115.2, 116.1; 180/197, 271, 282, 413, 443, 79.1; 701/37, 41, 23, 301, 48, 36, 70; 280/735, 734

(56) References Cited

U.S. PATENT DOCUMENTS

| | | | |
|---|---|---|---|
| 4,842,089 A | 6/1989 | Kimbrough et al. | 180/79.1 |
| 5,448,481 A | 9/1995 | Asanuma et al. | 364/424.05 |
| 5,720,533 A | 2/1998 | Pastor et al. | 303/147 |
| 5,734,570 A | 3/1998 | Arlandis | 364/424.052 |
| 5,941,919 A | 8/1999 | Pastor et al. | 701/36 |
| 6,161,905 A | 12/2000 | Hac et al. | 303/146 |
| 6,175,790 B1 | 1/2001 | Lin et al. | 701/36 |
| 6,181,997 B1 | 1/2001 | Badenoch et al. | |
| 6,226,581 B1 * | 5/2001 | Reimann et al. | 701/48 |
| 6,282,478 B1 | 8/2001 | Akita | 701/70 |
| 6,298,311 B1 | 10/2001 | Griffin et al. | |
| 6,315,373 B1 * | 11/2001 | Yamada et al. | 303/191 |
| 6,324,445 B2 * | 11/2001 | Tozu et al. | 701/1 |
| 6,453,226 B1 | 9/2002 | Hac et al. | |
| 6,481,806 B1 | 11/2002 | Krueger et al. | |
| 2001/0022468 A1 * | 9/2001 | Tozu et al. | 303/113.1 |
| 2001/0044688 A1 * | 11/2001 | Okita et al. | 701/92 |
| 2002/0042671 A1 * | 4/2002 | Chen et al. | 701/41 |
| 2002/0082749 A1 * | 6/2002 | Meyeres et al. | 701/1 |
| 2002/0087247 A1 * | 7/2002 | Tanaka et al. | 701/70 |
| 2002/0147532 A1 * | 10/2002 | Inagaki et al. | 701/41 |
| 2002/0198642 A1 * | 12/2002 | Klein et al. | 701/41 |

FOREIGN PATENT DOCUMENTS

| | | |
|---|---|---|
| EP | 1 078 803 A1 | 2/2001 |
| EP | 1 251 060 A2 | 10/2002 |
| WO | WO 01/56849 A1 | 8/2001 |

OTHER PUBLICATIONS

Vehicle Stability Enhancement Systems, TRAXXAR™, DELPHI Automotive Systems, 10/99.
Advanced Steering Systems, QUADRASTEER™ Four Wheel Steering, DELPHI Automotive Systems, 1999.

* cited by examiner

Primary Examiner—Thomas G. Black
Assistant Examiner—Tuan C To
(74) Attorney, Agent, or Firm—Michael D. Smith (57) ABSTRACT

A system and method for using vehicle operator intent to adjust a vehicle control system, comprising: at least one vehicle control system associated with a vehicle, the vehicle control system being enabled to execute computer programs, the vehicle control system being enabled to receive data signals, at least one sensor for sensing vehicle operator intent, the sensor being enabled for transmitting data signals to the vehicle control system, and a computer program for developing a response command in relation to a representation of vehicle operator intent, the representation further comprising received data signals.

15 Claims, 5 Drawing Sheets

SYSTEM AND METHOD FOR USING VEHICLE OPERATOR INTENT TO ADJUST VEHICLE CONTROL SYSTEM RESPONSE

BACKGROUND

Recent advances in technology, such as anti-lock braking systems, have resulted in the increased performance of vehicle control systems. One type of such a vehicle control system is a traction control system (TCS). The TCS monitors the automobile's wheels for a rapid acceleration that exceeds a predetermined value. When such a value is detected, the TCS applies a brake force to the accelerating wheels until the wheels' acceleration is within a predetermined range.

Another type of vehicle control system, stability control (SCS), assists a vehicle operator in maintaining control of a vehicle during side/lateral skidding by monitoring yaw rate and lateral acceleration and applying differential braking controls to correct the directional motion of the vehicle.

Another type of vehicle control system, four-wheel steering, enhances the stability of a vehicle at highway speeds by turning the rear-wheels in phase with the front-wheels, thus allowing for improved lane changing while reducing the necessity to change the heading of the vehicle. At lower speeds, four-wheel steering systems reduce the turning radius of a vehicle by turning the rear-wheels out-of-phase relative to the front-wheels.

While the goal of a vehicle control system is to anticipate a vehicle operator's intent and respond accordingly, vehicle control systems generally base their response on vehicle operator actions, such as the angling of the handwheel or the depression of the accelerator pedal, which are measured by sensors associated with the vehicle. For example, for a four-wheel steering system, the angling of a vehicle handwheel at high speeds may cause an estimation that the vehicle operator's intent is to translate a lane change. Similarly, the angling of a vehicle handwheel at low speeds may cause an estimation that the vehicle operator's intent is to change the vehicle's heading. A disadvantage of such methodologies is they do not account for circumstances where a vehicle operator's true intent may vary from the vehicle control system's estimate. For example, a vehicle operator's true intent may be to translate a lane at lower speeds or to turn the vehicle's heading at higher speeds. Therefore what is desired is a system and method for using vehicle operator intent to adjust a vehicle control system.

BRIEF DESCRIPTION OF THE INVENTION

A system and method for using vehicle operator intent to adjust a vehicle control system, comprising: at least one vehicle control system associated with a vehicle, the control system being enabled to execute computer programs, the control system being enabled to receive data signals; at least one sensor for sensing vehicle operator intent, the sensor being enabled for transmitting data signals to the control system; and a computer program for developing a response command in relation to a representation of vehicle operator intent, the representation further comprising received data signals.

DETAILED EMBODIMENT OF THE INVENTION

Figures 1, 2, 3:
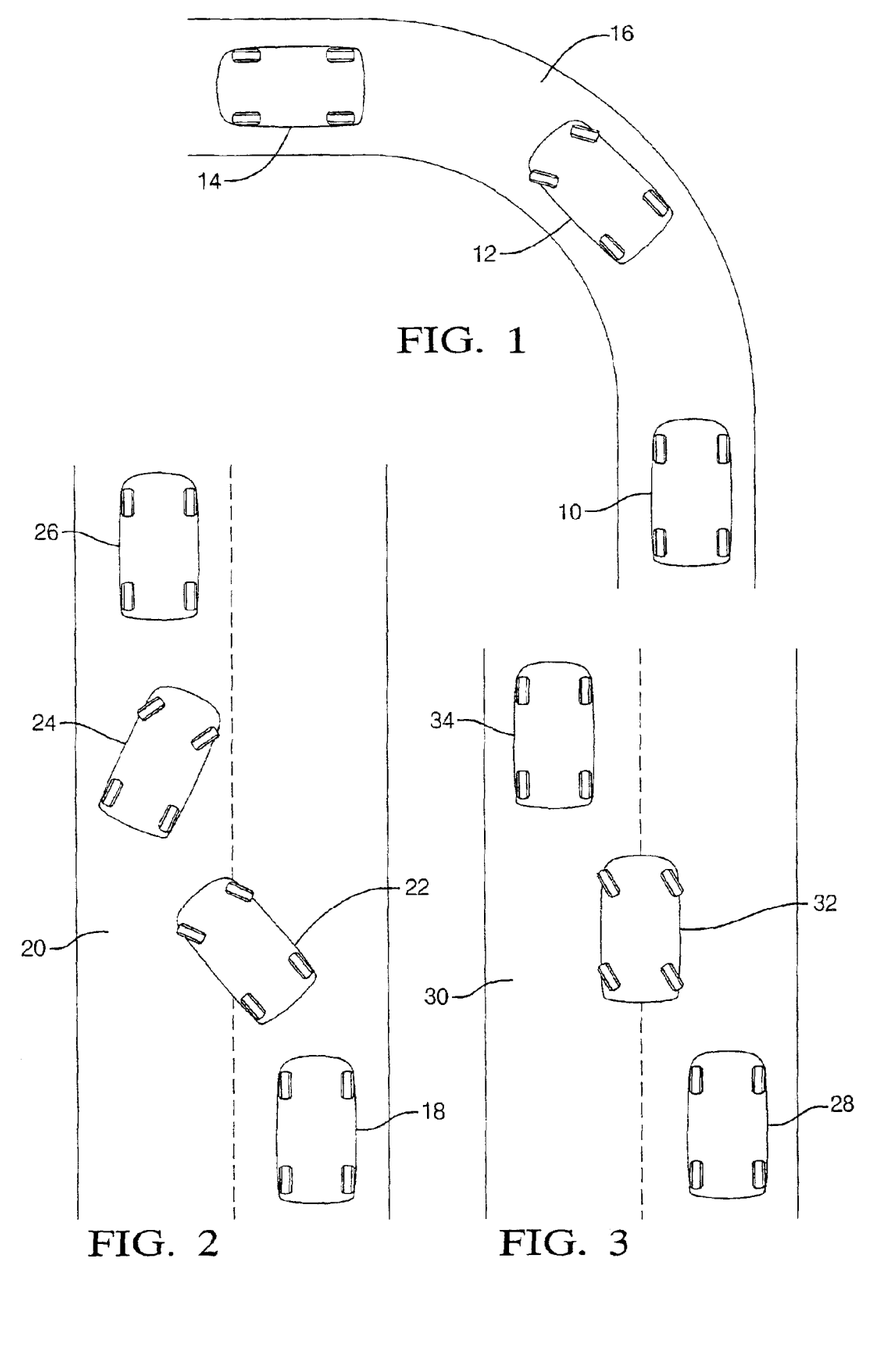
FIG. 1 shows a vehicle without a rear-wheel steering system changing its heading while traveling along a curved road.
FIG. 2 shows a vehicle without a rear-wheel steering system changing from one lane to another lane while traveling in the same direction.
FIG. 3 shows a vehicle equipped with a rear-wheel steering system changing from one lane to another lane while traveling in the same direction.

FIG. 1 shows a vehicle without a rear-wheel steering system changing its heading while traveling along a curved road 16 from a first position 10 to a second position 12 to a third position 14. The vehicle operator must rotate the vehicle's handwheel sufficiently to cause the vehicle's heading to correspond to the curvature of the road 16 resulting in the generation of yaw and a corresponding lateral acceleration.

FIG. 2 shows a vehicle without a rear-wheel steering system changing from one lane to another lane while traveling in the same direction. In order to change lanes, the vehicle operator must make a series of handwheel adjustments. Initially, the vehicle 18 is traveling in the right lane of the road 20. The vehicle operator rotates the handwheel counter-clockwise causing the vehicle 22 to move from the right lane to the left lane. Once the vehicle 24 is traveling in the left lane, the vehicle operator rotates the handwheel clockwise to counteract excessive yaw caused by the vehicle operator's previous counter clockwise rotation of the handwheel. Finally, the vehicle operator rotates the handwheel counter-clockwise to cause the vehicle 26 to travel in a direction parallel to the road 20. It is understood that FIG. 2 depicts an exemplary vehicle lane change and that a vehicle lane change may be achieved using an alternative series of handwheel movements. For example, a lane change could be achieved by angling the handwheel counter-clockwise, followed by straightening the handwheel, followed by angling the handwheel clockwise, followed by straightening the handwheel.

Vehicles equipped with rear-wheel steering systems are capable of changing lanes with little or no change to vehicle heading and require a vehicle operator to make fewer handwheel adjustments. Moreover, when such a vehicle makes a purely translational lane change, there is little or no generation of yaw and thus the vehicle is better enabled to maximize traction and stability. As shown in FIG. 3, the vehicle 28 is initially traveling in the right lane of the road 30. The vehicle operator rotates the handwheel counter-clockwise causing the vehicle 32 to move from the right lane to the left lane. Once the vehicle 34 is traveling in the left lane, the vehicle operator rotates the handwheel clockwise to maintain the vehicle's 34 direction of travel.

A rear-wheel steering control system employing separate closed-loop feedback controller and open-loop feedforward control paths is disclosed in U.S. Pat. No. 4,842,089 and is assigned to the assignee of the present application. The closed-loop feedback path may be optimized to enhance directional stability, to compensate for changes in vehicle or road condition, and to shape the steady-state response of the system. The separate open-loop feedforward control path may be optimized to shape both the transient and the steady-state response of the system. By separating the open-loop and closed-loop control paths, the authority and/or delay properties of the two paths may be independently varied for the optimum response.

While an embodiment describes the use of vehicle operator intent to adjust a rear-wheel steering system wherein open-loop feedforward and closed-loop feedback are employed, it is understood that the present disclosure may be used in a vehicle with a plurality of vehicle control systems. Moreover, it is also understood that any vehicle control system known to one of ordinary skill in the art may be used including vehicle control systems that do not employ either open-loop feedforward or closed-loop feedback commands. In addition, while an embodiment describes the use of a single sensor device for determining driver intent, it is understood that a plurality of sensor devices may be used for determining driver intent without exceeding the scope of this disclosure.

Figure 4:
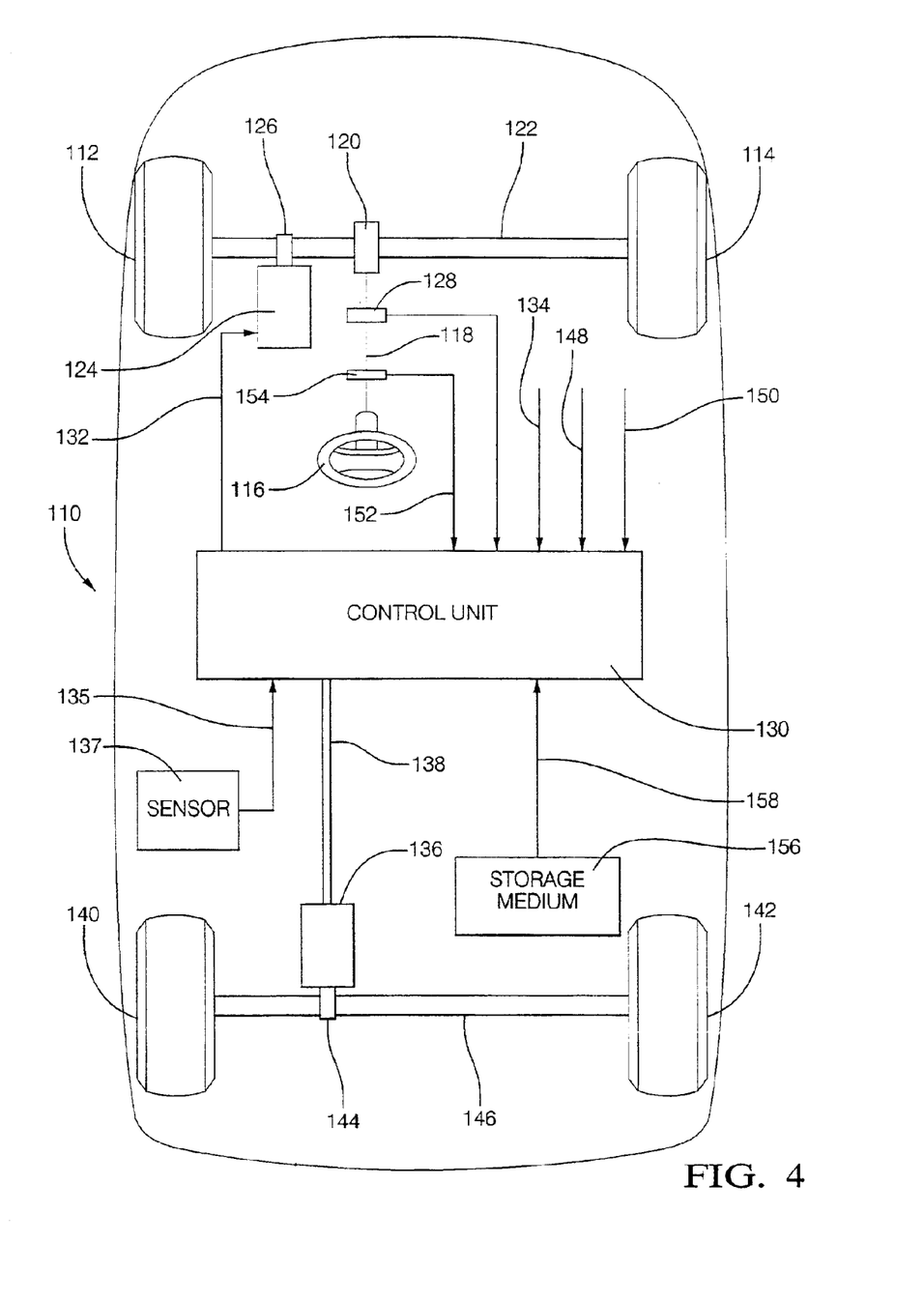
FIG. 4 shows a vehicle equipped with front and rear-wheel steering systems and enabled for using vehicle operator intent to adjust the rear-wheel steering system control.

Referring now particularly to FIG. 4, a vehicle equipped with front and rear-wheel steering systems and enabled for using vehicle operator intent to adjust the rear-wheel steering system control is illustrated. Reference numeral 110 generally designates a motor vehicle having four steerable wheels. The front-wheels 112, 114 are steered together in response to rotation of an operator manipulated handwheel 116. The handwheel 116 is mechanically connected via steering column 118 to a pinion gear 120 which is maintained in meshing engagement with teeth formed on a front rack 122. The front rack 122, in turn, is connected to front-wheel tie rods (not shown), completing the mechanical linkage connecting the front-wheels 112, 114 to the handwheel 116.

An electric motor 124 drives a second pinion gear 126, also maintained in meshing engagement with the front rack teeth. The motor 124 is adapted to be energized in relation to the operator exerted steering torque for generating a power steering assist torque which aids the vehicle operator exerted torque. To this end, a torque sensor 128 is disposed in relation to the steering column 118 for generating an electrical signal in accordance with the operator exerted steering torque. Such signal is applied as an input to a computer-based control unit 130, which among other things, controls the energization of electric motor 124 via line 132 for generating the proper magnitude and direction of steering assist. A signal indicative of the vehicle speed $V_x$ is applied as an input to the control unit 130 via line 134, which signal may also be used as a parameter for steering control. A signal indicative of the vehicle operator intent $I_d$ is applied as an input to the control unit 130 via line 135, which signal may also be used as a parameter for steering control. To this end, a plurality of sensors 137 are disposed in relation to the control unit 130 for generating an electrical signal in accordance with the vehicle operator's intent.

The control unit 130 also controls the energization of an electric motor 136 as indicated by the line 138 to control the steering of rear-wheels 140, 142. The motor 136 rotatably drives a pinion gear 144 which is maintained in meshing engagement with teeth formed on a rear rack 146. The rack 146, in turn is mechanically connected to the rear-wheel tie rods (not shown) so that the rear-wheels 140, 142 steer together. In mechanizing such control, electrical signals indicative of the lateral and yaw velocities $V_y$, r and the front steering angle $D_f$ are supplied as inputs to the control unit 130 via lines 148–152. The lateral and yaw velocity inputs are obtained with accelerometers (not shown), and the front steering angle $D_f$ is obtained with rotary potentiometer 154 responsive to the rotary position of handwheel 116.

The computer based control unit 130 performs the functions of a front steering angle filter, a reference model map, an open-loop controller, a closed-loop controller, and a summing junction. A computer program for performing said functions is located in a storage medium 156. The storage medium 156 may be separate from the control unit 130 or an integrated component of the control unit 130. The control unit 130 is enabled to receive said program code via a propagated data signal 158. The control unit 130 may implement one or more vehicle control systems such as an anti-lock braking system, traction control system, stability control system, front-wheel steering system, rear-wheel steering system, or four-wheel steering system.

Determining Vehicle Operator Intent

In order to determine a vehicle operator's intent, a vehicle control system must be enabled to receive a representation of the intent. The intent is determined from data signals received by the control unit 130. The data signals are received from a plurality of sensors 137. The plurality of sensors 137 comprise any combination of sensors and sensor types known to one of ordinary skill in the art. A vehicle is equipped with a combination of vehicle operator intent sensors for purposes including enhancing the accuracy of the representation of the vehicle operator's intent. By way of example and for purposes of explanation, several types of sensors are discussed.

In a first example, the sensors include a visual detection device that is enabled to indicate the path of the road immediately ahead of the vehicle. Where road curvature or intersections are indicated, data signals represent the vehicle operator's intent to be to turn the vehicle. Where the road does not curve or intersect a second road, data signals represent the vehicle operator's intent to be to translate a lane change.

In a second example, the sensors include a global positioning satellite ("GPS") device. Where the GPS device indicates that the vehicle is approaching an intersection, data signals represent the vehicle operator's intent to be to turn the vehicle. Where the GPS device indicates that the vehicle is traveling on a highway, data signals represent the vehicle operator's intent to be to translate a lane change.

In a third example, the sensors include a vehicle handwheel velocity meter. Where a vehicle operator causes quick, large changes in hand-wheel angle, data signals represent the vehicle operator's intent to be to be to turn the vehicle. Where a vehicle operator causes slow, small changes in hand-wheel angle, data signals represent the vehicle operator's intent to be to translate a lane change.

In a fourth example, the sensors include a first device that is in communication with a second device wherein said second device is not located in said vehicle. The second device may be mobile, such as a device located in an adjacent vehicle, or fixed, such as a device located in a roadside railing or post. The second device provides information concerning roadway conditions such as the presence of curves, speed limits, etc. which can then be used to interpret operator's intent when combined with other signals (e.g., handwheel velocity, vehicle speed, etc.).

In another example, the sensors include a vehicle operator actuated switch. In such a case, the vehicle operator directly relays intent to the control system. In yet another example, a vehicle is equipped with a vehicle operator actuated switch, such as a turn signal, a GPS device, and a vehicle speed sensor. Where a street having a low speed limit is located parallel to and so close to a highway having a high speed limit that GPS indicators alone is insufficient for concluding on which road the vehicle is traveling, low vehicle speed coupled with turn signal actuation would cause the representation of the vehicle operator's intent to be to turn the vehicle.

Adjusting the Vehicle Control System

The vehicle control system generates a command to be carried out by the vehicle that is responsive to vehicle operator actions, such as the depression of an accelerator pedal or the angling of the vehicle handwheel and driver intent. In the case of a rear-wheel steering system, the computer based control unit sends a response command Dr(CMD) to the vehicle's rear-wheel actuators. In accordance with the present disclosure, the response command Dr(CMD) is at least in part a function of vehicle operator intent.

Figure 5:
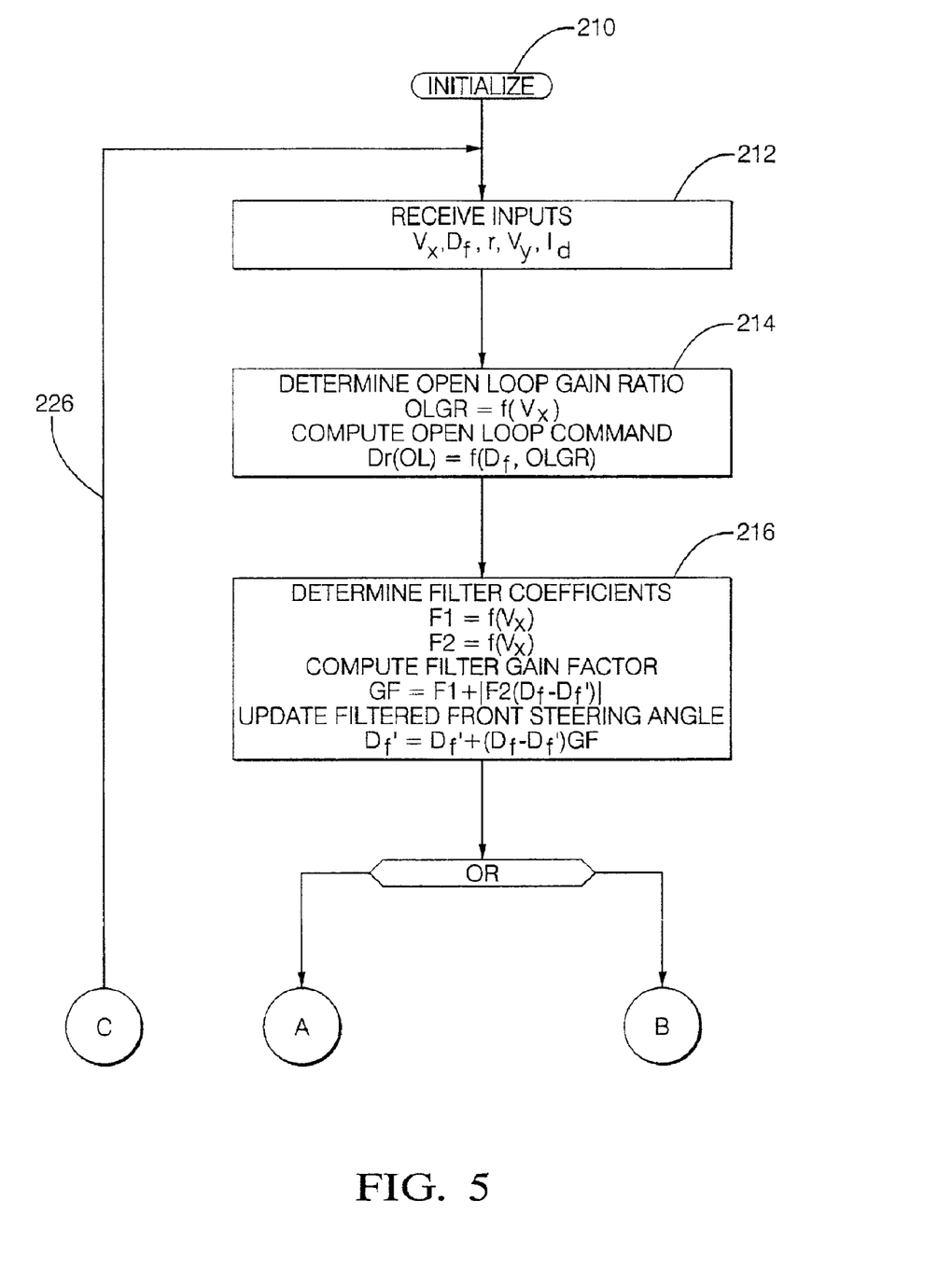
FIGS. 5 and 6 are a flowchart for using vehicle operator intent to adjust a rear-wheel steering control system.
Figure 6:
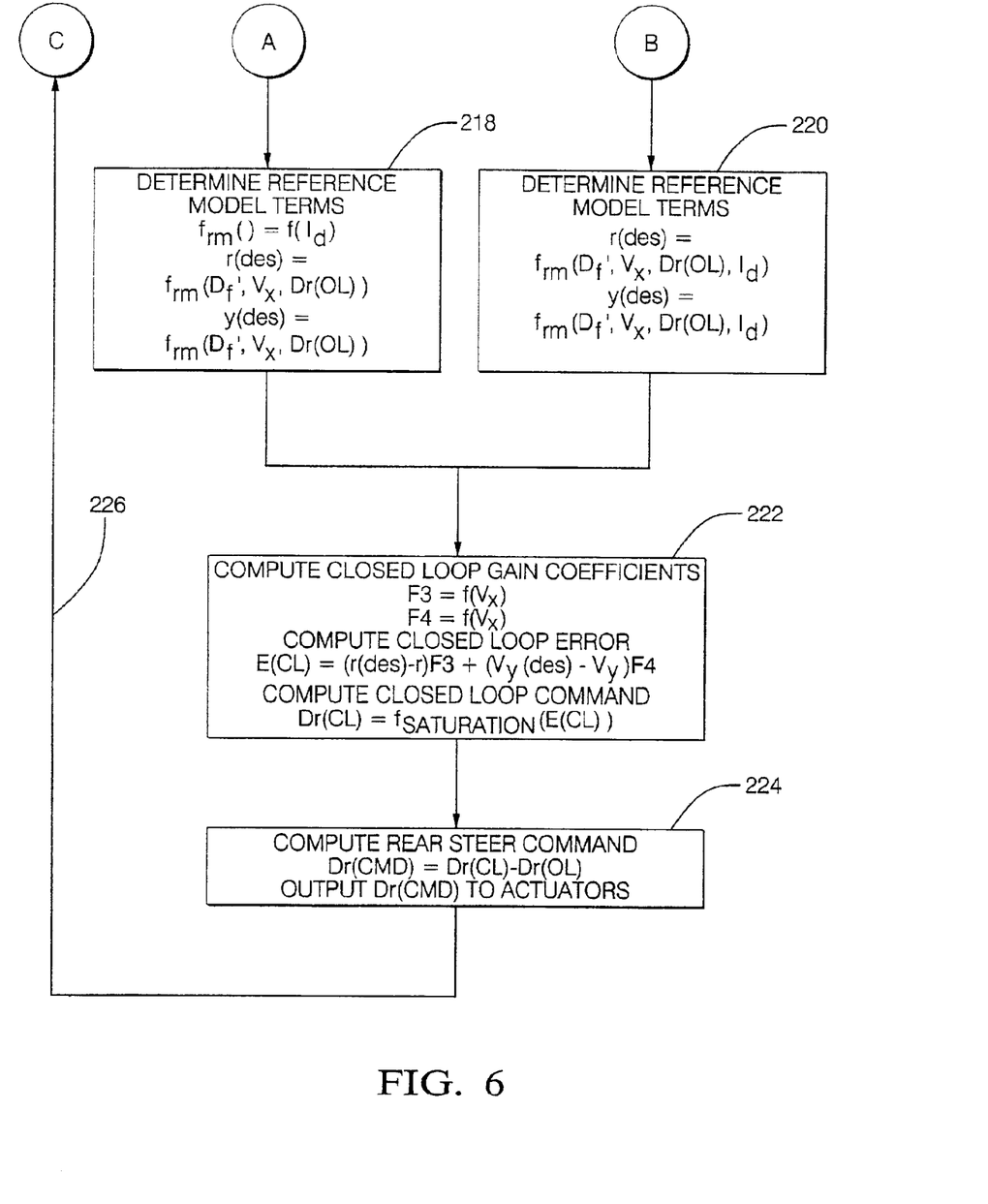

The flow chart of FIGS. 5 and 6 represent a computer program executed by the computer based control unit in carrying out the vehicle control system's response. The initialization block 210 represents a series of instructions executed at the initialization of each period of vehicle operation for initializing the various registers, input counters and flags used in connection with the control of this invention. Thereafter, the instruction blocks 212–224 are repeatedly and sequentially executed as indicated by the flow lines and the return line 226.

Referring now to FIG. 5, the control unit is initialized 210. The control unit receives the various input signals at 212 including those for longitudinal velocity $V_x$, vehicle operator intent $I_d$, actual lateral or slip velocity $V_y$, actual yaw velocity r, and front-wheel steering angle $D_f$. As indicated in FIG. 4, such signals are supplied to the control unit 130 via lines 134, 135, 148, 150, and 152, respectively.

The instruction block 214 pertains to the open-loop feedforward function designated by the control unit 130 in FIG. 4. The performance of such function comprises the steps of determining the open-loop gain ratio OLGR as a function of the longitudinal velocity $V_x$, and computing the open-loop feedforward command Dr(OL) as a function of the measured front-wheel steering angle $D_f$ and OLGR.

$$OLGR = f(V_x)$$

$$Dr(OL) = f(D_f, OLGR)$$

The instruction block 216 pertains to the front-wheel steering angle filter function designated by the filter implemented by control unit 130 in FIG. 4. The filtered front-wheel steering angle $D_f'$ is desired for noise rejection in the closed-loop feedback control path. On initialization of the control, the instructions designated by block 210 initially set the filtered front-wheel steering value $D_f'$ to zero. Coefficients F1 and F2 are determined, the gain factor GF is computed, and the filtered output $D_f'$ is updated according to the product of the steering angle change and the computed gain factor GF.

$$F1 = f(V_x)$$

$$F2 = f(V_x)$$

$$GF = F1 + |F2(D_f - D_f')|$$

$$D_f' = D_f' + (D_f - D_f')GF$$

Referring now to FIG. 6, the instruction block 218 pertains to reference model function designated by the reference model map provided by control unit 130 in FIG. 4. The reference model map defines a desired vehicle response in terms of the desired yaw velocity r(des) and desired lateral or slip velocity $V_y$(des). The reference model map is based on a cornering model of the vehicle and generates a static or steady-state reference point (r(des), $V_y$(des)) for the closed-loop controller to follow. The reference model map is determined as a function of vehicle operator intent. The filtered front-wheel steering angle, $D_f'$, in turn, is applied as an input to the reference model map together with the longitudinal velocity indication $V_x$ and the open-loop feedforward steering command Dr(OL) to achieve the desired yaw velocity r(des) and desired lateral or slip velocity $V_y$(des).

$$f_{reference\ model}() = f(I_d)$$

$$r(des) = f_{reference\ model}(D_f', V_x, Dr(OL))$$

$$V_y(des) = f_{reference\ model}(D_f', V_x, Dr(OL))$$

Where the vehicle operator's intent is determined to be to cause the vehicle to turn, $f_{reference\ model}()$ is defined such that a heavy yaw-rate and feedforward control are employed. Where the vehicle operator's intent is determined to be to cause the vehicle to translate a lane change, $f_{reference\ model}()$ is defined such that a light yaw-rate, and a heavy lateral acceleration and feedforward control are employed. Where a vehicle operator's intent is determined to be a compromise between causing a turn and causing a lane change, $f_{reference\ model}()$ and thus the control system's response, are varied accordingly.

In another embodiment shown at 220, vehicle operator intent is applied as an input to the reference model map together with the filtered front-wheel steering angle $D_f'$, the longitudinal velocity indication $V_x$, and the open-loop feedforward steering command Dr(OL).

$$r(des) = f_{reference\ model}(D_f', V_x, Dr(OL), I_d)$$

$$V_y(des) = f_{reference\ model}(D_f', V_x, Dr(OL), I_d)$$

The instruction block 222 pertains to the closed-loop control function provided by control unit 130 in FIG. 4. Coefficients F3 and F4 are determined. The closed-loop error term is determined as a function of the desired yaw and lateral velocity terms r(des), y(des) and the measured yaw and lateral and longitudinal velocities (r, $V_y$ and $V_x$).

$$F3 = f(V_x)$$

$$F4 = f(V_x)$$

$$E(CL) = (r(des) - r)F3 + (V_y(des) - V_y)F4$$

A closed-loop feedback steering command Dr(CL), is in turn determined by applying the closed-loop error term E(CL) to a saturation function. The saturation (limiting) point is scheduled as a function of the longitudinal velocity $V_x$. The closed-loop steering command is used to bring the actual yaw and lateral velocities into correspondence with the desired yaw and lateral velocities.

$$Dr(CL) = f_{saturation}(E(CL))$$

The closed-loop feedback steering command Dr(CL) and the open-loop feedforward command Dr(OL) are differenced 224 by a summing operation provided by control unit 130 in FIG. 4 to form a rear steering command Dr(CMD).

$$Dr(CMD) = Dr(CL) - Dr(OL)$$

The rear steering command Dr(CMD) is applied to the rear-wheel actuators which, in turn, position the rear-wheels accordingly.

It is understood by one of ordinary skill in the art that any method for incorporating operator intent into a vehicle control system's response may be used. It is also understood that while the preferred embodiment describes a vehicle control system having both open-loop feedforward and closed-loop feedback elements, the present disclosure may be applicable to vehicle control systems having only one of said elements, variations of said elements, or neither of said elements.

Figure 7:
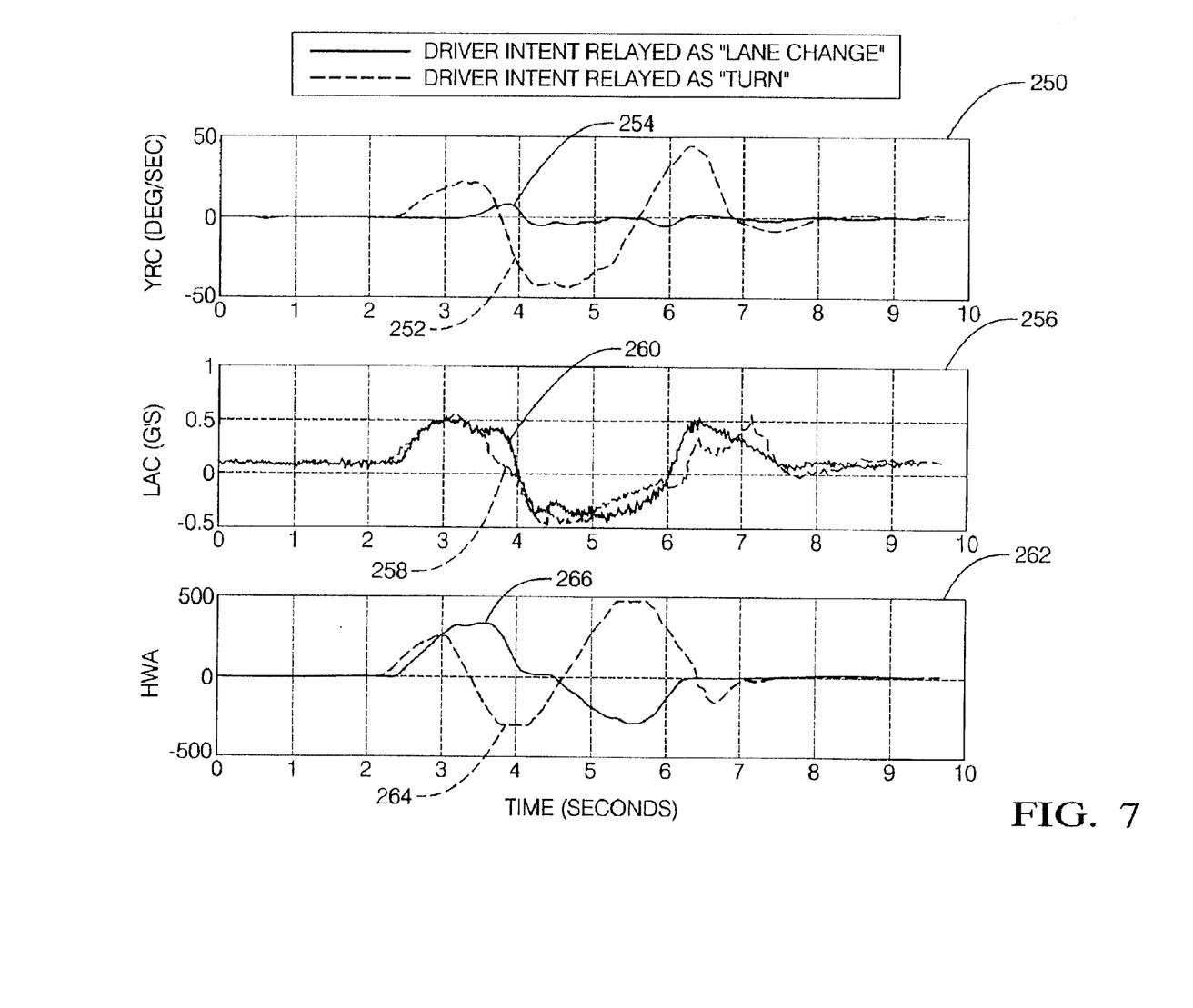
FIG. 7 graphically compares yaw rate and lateral acceleration versus time during a double lane change on packed snow for a vehicle interpreting driver intent to be to turn the vehicle and for a vehicle interpreting driver intent to be to cause the vehicle to change lanes.

FIG. 7 illustrates enhanced vehicle performance where a vehicle equipped with a rear-wheel steering system has accurately interpreted the vehicle operator's intent. For purposes of the following examples the vehicle is equipped with a vehicle operator actuated switch for directly relaying vehicle operator intent to the rear-wheel steering system. A first graph 250 charts yaw rate for a double lane change on packed snow. As shown in plot 252, a high yaw rate is caused where the rear-wheel steering system inaccurately determines the vehicle operator's intent to be to turn the heading of the vehicle. However, there is a significant reduction in yaw rate where the rear-wheel steering system properly determines the driver's intent to be to traverse a lane change as shown in plot 254. A second graph 256 charts lateral acceleration for a double lane change on packed snow. As shown, the lateral acceleration of the vehicle remains similar regardless of whether the vehicle control system inaccurately (plot 258) or accurately (plot 260) determines vehicle operator intent.

A third graph 262 illustrates the effort, measured using handwheel acceleration, that is required of the vehicle operator during a double lane change on packed snow. Where the vehicle control system inaccurately determines the vehicle operator's intent to be to turn the heading of the vehicle (plot 264), greater handwheel acceleration is measured than when the rear-wheel steering system accurately determines the vehicle operator's intent to be to traverse a lane (plot 266). In the second instance the vehicle operator need not make excessive, multiple corrections to remove the build of yaw rate that would otherwise occur.

In an alternative embodiment, this system may also be used with a vehicle lane keeping system. In particular, sensors may provide to the lane-keeping system information regarding conditions of the road such as (but not limited to) current curvature, number of lanes, or even adjacent traffic.

The disclosed method may be embodied in the form of computer-implemented processes and apparatuses for practicing those processes. The method can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus capable of executing the method. The present method can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus capable of executing the method. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for using vehicle operator intent to adjust a vehicle control system, comprising:

a vehicle;

at least one of the following vehicle control systems: an anti-lock braking system, traction control system, stability control system, front-wheel steering system, rear-wheel steering system, or four-wheel steering system, said vehicle control system being associated with said vehicle, said vehicle control system being enabled to execute computer programs, said vehicle control system being enabled to receive data signals;

at least one sensor for sensing vehicle operator intent to turn or translate said vehicle, independent of handwheel angle, said sensor being associated with said vehicle, said sensor being enabled for transmitting data signals to said vehicle control system; and said vehicle control system developing a response command in relation to a representation of vehicle operator intent and at least one of the following: longitudinal velocity, lateral velocity, handwheel velocity, yaw rate, or handwheel angle, said representation comprising said received data signals.

2. A system as in claim 1 wherein said vehicle control system includes open-loop feedforward and a closed-loop feedback.

3. A system as in claim 1 wherein said data signals further comprise at least one of the following propagated signals: electrical signals, optical signals, or electromagnetic signals.

4. A system as in claim 1 wherein said sensor further comprises at least one of the following: an optical sensor, a vehicle location sensor, a hand-wheel velocity sensor, a vehicle operator actuated switch, or a first device for communicating with a second device, said second device not being located in said vehicle.

5. A method for using vehicle operator intent to adjust a vehicle control system, comprising:

sensing vehicle operator intent to turn or translate said vehicle, independent of handwheel angle, said intent being sensed using at least one sensor, said sensor being enabled for transmitting data signals to said vehicle control system;

generating a vehicle control system response command in relation to a representation of said intent and at least one of the following: longitudinal velocity, lateral velocity, handwheel velocity, yaw rate, or handwheel angle, said representation comprising received data signals; and using said response command for controlling at least one of the following vehicle control systems: an anti-lock braking system, traction control system, stability control system, front-wheel steering system, rear-wheel steering system, or four-wheel steering system.

6. A method as in claim 5 wherein said vehicle control system includes open-loop feedforward and closed-loop feedback.

7. A method as in claim 5 wherein said sensor further comprises at least one of the following: an optical sensor, a vehicle location sensor, a hand-wheel velocity sensor, a vehicle operator actuated switch, or a first device for communicating with a second device, said second device not being located in said vehicle.

8. A system for using vehicle operator intent to adjust a rear-wheel steering system, comprising:
- a vehicle, said vehicle having a rear-wheel steering system, said rear-wheel steering system being enabled to execute computer programs, said rear-wheel steering system being enabled to receive data signals;
- at least one sensor for sensing vehicle operator intent to turn or translate said vehicle, independent of hand-wheel angle, said sensor being enabled for transmitting data signals to said rear-wheel steering system;
- said rear-wheel steering system developing an open-loop steering command in relation to a representation of vehicle longitudinal velocity and in relation to a representation of vehicle hand-wheel angle, said hand-wheel angle and longitudinal velocity representations comprising received data signals;
- said rear-wheel steering system developing a closed-loop steering command, further comprising: (1) generating yaw and lateral velocity commands in relation to said open-loop steering command and representations of vehicle hand-wheel angle and said vehicle operator intent, said vehicle hand-wheel angle and said vehicle operator intent representations further comprising received data signals, (2) determining the actual yaw and longitudinal velocities of the vehicle, and (3) developing a closed-loop steering command in relation to the deviation of the actual yaw and lateral velocities from the commanded yaw and lateral velocities;
- said rear-wheel steering system developing a steering command according to the open-loop and closed-loop steering commands; and
- an actuator means for steering the rear-wheels of the vehicle in accordance with the steering command.

9. A system as in claim 8 wherein said data signals further comprise at least one of the following propagated signals: electrical signals, optical signals, or electromagnetic signals.

10. A system as in claim 8 wherein said sensor further comprises at least one of the following: an optical sensor, a vehicle location sensor, a hand-wheel velocity sensor, a vehicle operator actuated switch, or a first device for communicating with a second device, said second device not being located in said vehicle.

11. A method for using vehicle operator intent to adjust a rear-wheel steering system, comprising:
- developing an open-loop steering command in relation to a representation of vehicle longitudinal velocity and in relation to a representation of vehicle hand-wheel angle, said hand-wheel angle and longitudinal velocity representations comprising received data signals;
- developing a closed-loop steering command, further comprising: (1) generating yaw and lateral velocity commands in relation to said open-loop steering command and representations of vehicle hand-wheel angle and vehicle operator intent to turn or translate said vehicle, independent of hand-wheel angle, said vehicle hand-wheel angle and vehicle operator intent representations further comprising received data signals, (2) determining the actual yaw and longitudinal velocities of the vehicle, and (3) developing a closed-loop steering command in relation to the deviation of the actual yaw and lateral velocities from the commanded yaw and lateral velocities;
- developing a steering command according to the open-loop and closed-loop steering commands; and
- steering rear-wheels of the vehicle in accordance with the steering command.

12. A method as in claim 11 wherein said data signals further comprise at least one of the following propagated signals: electrical signals, optical signals, or electromagnetic signals.

13. A method as in claim 11 wherein said sensor further comprises at least one of the following: an optical sensor, a vehicle location sensor, a hand-wheel velocity sensor, a vehicle operator actuated switch, and a first device for communicating with a second device, said second device not being located in said vehicle.

14. An article of manufacture comprising: a computer usable medium having computer readable program code embodied therein for using vehicle operator intent to adjust a vehicle control system, comprising:
- computer readable program code for sensing vehicle operator intent to turn or translate said vehicle, independent of handwheel angle, said intent being sensed using at least one sensor, said sensor being enabled for transmitting data signals to said vehicle control system, said vehicle control system comprising at least one of the following vehicle control systems: an anti-lock braking system, traction control system, stability control system, front-wheel steering system, rear-wheel steering system, or four-wheel steering system, said system being associated with a vehicle; and
- computer readable program code for generating a vehicle control system response command in relation to a representation of said intent and at least one of the following: vehicle operator intent, longitudinal velocity, lateral velocity, handwheel velocity, yaw rate, or handwheel angle, said representation comprising said received data signals.

15. A computer data signal embodied in a carrier wave, the computer data signal comprising:
- computer readable program code for sensing vehicle operator intent to turn or translate said vehicle, independent of handwheel angle and for transmitting a data signal representation of said intent to a vehicle control system, said intent being sensed using at least one sensor, said vehicle control system comprising at least one of the following vehicle control systems: an anti-lock braking system, traction control system, stability control system, front-wheel steering system, rear-wheel steering system, or four-wheel steering system; and
- computer readable program code for generating a vehicle control system response command in relation to said representation of said vehicle operator intent and at least one of the following: longitudinal velocity, lateral velocity, handwheel velocity, yaw rate, or handwheel angle, said representation comprising said received data signals, said representation comprising received data signals.

* * * * *